(12) United States Patent
Melton et al.

(10) Patent No.: US 9,249,734 B2
(45) Date of Patent: Feb. 2, 2016

(54) COMBUSTOR

(75) Inventors: Patrick Benedict Melton, Horse Shoe, NC (US); Keith Cletus Belsom, Laurens, SC (US); Lucas John Stoia, Taylors, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 876 days.

(21) Appl. No.: 13/545,272

(22) Filed: Jul. 10, 2012

(65) Prior Publication Data
US 2014/0013756 A1 Jan. 16, 2014

(51) Int. Cl.
*F02C 7/22* (2006.01)
*F23R 3/28* (2006.01)

(52) U.S. Cl.
CPC ... *F02C 7/22* (2013.01); *F23R 3/28* (2013.01); *F05D 2260/96* (2013.01); *F23R 2900/00014* (2013.01)

(58) Field of Classification Search
CPC .................. F02C 7/22; F05D 2260/96; F23R 2900/00014; F23R 3/28
USPC ......................................................... 60/725
See application file for complete search history.

(56) References Cited

U.S. PATENT DOCUMENTS

| | | |
|---|---|---|
| 3,771,500 A | 11/1973 | Shakiba |
| 4,104,873 A | 8/1978 | Coffinberry |
| 4,412,414 A | 11/1983 | Novick et al. |
| 5,104,310 A | 4/1992 | Saltin |
| 5,205,120 A | 4/1993 | Oblander et al. |
| 5,213,494 A | 5/1993 | Jeppesen |
| 5,341,645 A | 8/1994 | Ansart et al. |
| 5,439,532 A | 8/1995 | Fraas |
| 5,592,819 A | 1/1997 | Ansart et al. |
| 5,707,591 A | 1/1998 | Semedard et al. |
| 6,098,407 A | 8/2000 | Korzendorfer et al. |
| 6,123,542 A | 9/2000 | Joshi et al. |
| 6,394,791 B2 | 5/2002 | Smith et al. |
| 6,438,961 B2 | 8/2002 | Tuthill et al. |
| 6,530,221 B1 * | 3/2003 | Sattinger et al. ................ 60/725 |
| 6,796,790 B2 | 9/2004 | Venizelos et al. |
| 6,983,600 B1 | 1/2006 | Dinu et al. |
| 7,003,958 B2 | 2/2006 | Dinu et al. |
| 7,007,478 B2 | 3/2006 | Dinu |
| 7,631,499 B2 | 12/2009 | Bland |
| 7,752,850 B2 | 7/2010 | Laster et al. |
| 8,511,086 B1 * | 8/2013 | Uhm et al. ...................... 60/737 |
| 8,801,428 B2 * | 8/2014 | Melton et al. ................... 60/737 |
| 2004/0216463 A1 | 11/2004 | Harris |
| 2006/0059913 A1 * | 3/2006 | Bethke et al. .................... 60/725 |
| 2008/0016876 A1 | 1/2008 | Colibaba-Evulet et al. |
| 2008/0304958 A1 | 12/2008 | Norris et al. |
| 2009/0297996 A1 | 12/2009 | Vatsky et al. |
| 2010/0008179 A1 | 1/2010 | Lacy et al. |
| 2010/0024426 A1 | 2/2010 | Varatharajan et al. |
| 2010/0031662 A1 | 2/2010 | Zuo |
| 2010/0060391 A1 | 3/2010 | Ristola et al. |
| 2010/0084490 A1 | 4/2010 | Zuo et al. |

(Continued)

*Primary Examiner* — Ted Kim
(74) *Attorney, Agent, or Firm* — Dority & Manning, PA

(57) ABSTRACT

A combustor includes an upstream surface that extends radially across at least a portion of the combustor, a downstream surface that extends radially across at least a portion of the combustor and is axially separated from the upstream surface, and a plurality of tubes that extend through the downstream surface. A resonator is upstream from at least one of the tubes, and a fluid passage extends through the resonator and into the least one tube.

18 Claims, 5 Drawing Sheets

(56) References Cited

U.S. PATENT DOCUMENTS

| | | |
|---|---|---|
| 2010/0089367 A1 | 4/2010 | Johnson et al. |
| 2010/0095676 A1 | 4/2010 | Uhm et al. |
| 2010/0139280 A1 | 6/2010 | Lacey et al. |
| 2010/0186413 A1 | 7/2010 | Lacey et al. |
| 2010/0192581 A1 | 8/2010 | Ziminsky et al. |
| 2010/0218501 A1 | 9/2010 | York et al. |
| 2010/0236247 A1 | 9/2010 | Davis, Jr. et al. |
| 2010/0252652 A1 | 10/2010 | Johnson et al. |
| 2010/0287942 A1 | 11/2010 | Zuo et al. |
| 2011/0016871 A1 | 1/2011 | Kraemer et al. |
| 2011/0023493 A1* | 2/2011 | Jain et al. .......... 60/747 |
| 2011/0072824 A1 | 3/2011 | Zuo et al. |
| 2011/0073684 A1 | 3/2011 | Johnson et al. |
| 2011/0083439 A1 | 4/2011 | Zuo et al. |
| 2011/0089266 A1 | 4/2011 | Stoia et al. |
| 2013/0019602 A1* | 1/2013 | Kim et al. .......... 60/725 |

* cited by examiner

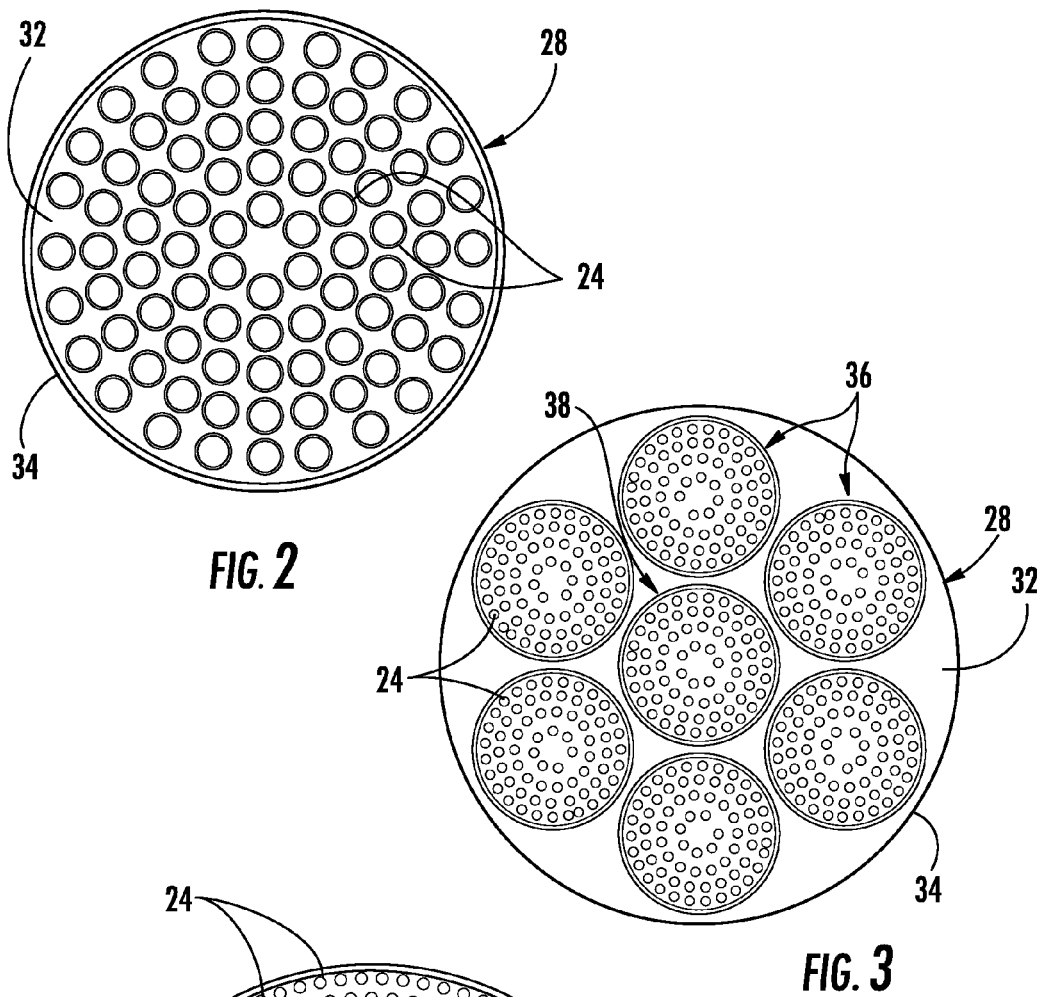
FIG. 2
FIG. 3
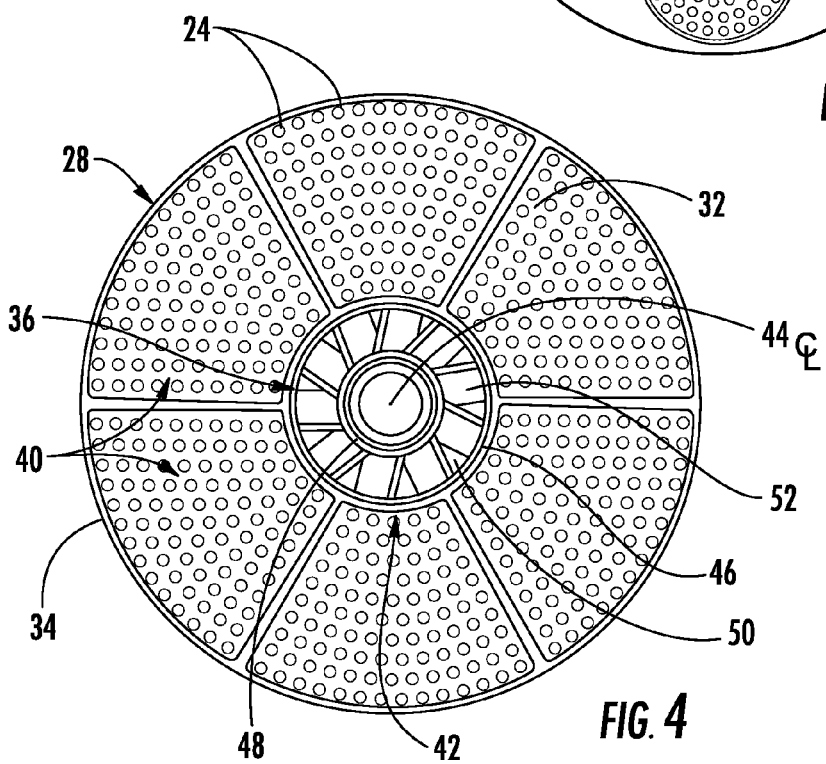
FIG. 4

COMBUSTOR

FIELD OF THE INVENTION

The present invention generally involves a combustor and a method for supplying fuel to a combustor.

BACKGROUND OF THE INVENTION

Combustors are commonly used in industrial and power generation operations to ignite fuel to produce combustion gases having a high temperature and pressure. For example, gas turbines typically include one or more combustors to generate power or thrust. A typical gas turbine used to generate electrical power includes an axial compressor at the front, one or more combustors around the middle, and a turbine at the rear. Ambient air may be supplied to the compressor, and rotating blades and stationary vanes in the compressor progressively impart kinetic energy to the working fluid (air) to produce a compressed working fluid at a highly energized state. The compressed working fluid exits the compressor and flows through one or more nozzles into a combustion chamber in each combustor where the compressed working fluid mixes with fuel and ignites to generate combustion gases having a high temperature and pressure. The combustion gases expand in the turbine to produce work. For example, expansion of the combustion gases in the turbine may rotate a shaft connected to a generator to produce electricity.

Various design and operating parameters influence the design and operation of combustors. For example, higher combustion gas temperatures generally improve the thermodynamic efficiency of the combustor. However, higher combustion gas temperatures also promote flame holding conditions in which the combustion flame migrates towards the fuel being supplied by the nozzles, increasing wear to the nozzles in a relatively short amount of time. In addition, higher combustion gas temperatures generally increase the disassociation rate of diatomic nitrogen, increasing the production of nitrogen oxides ($NO_x$). Conversely, a lower combustion gas temperature associated with reduced fuel flow and/or part load operation (turndown) generally reduces the chemical reaction rates of the combustion gases, increasing the production of carbon monoxide and unburned hydrocarbons.

In a particular combustor design, a plurality of tubes may be radially arranged in an end cap to provide fluid communication through the end cap and into the combustion chamber for the working fluid and the fuel. Although effective at enabling higher operating temperatures while protecting against flame holding and controlling undesirable emissions, some fuels and operating conditions produce very high frequencies with high hydrogen fuel composition in the combustor. Increased vibrations in the combustor associated with high frequencies may reduce the useful life of one or more combustor components. Alternately, or in addition, high frequencies of combustion dynamics may produce pressure pulses inside the tubes and/or combustion chamber that affect the stability of the combustion flame, reduce the design margins for flame holding, and/or increase undesirable emissions. Therefore, a system and method that reduces resonant frequencies in the combustor would be useful to enhancing the thermodynamic efficiency of the combustor, protecting the combustor from accelerated wear, and/or reducing undesirable emissions over a wide range of combustor operating levels.

BRIEF DESCRIPTION OF THE INVENTION

Aspects and advantages of the invention are circuit forth below in the following description, or may be obvious from the description, or may be learned through practice of the invention.

One embodiment of the present invention is a combustor that includes an upstream surface that extends radially across at least a portion of the combustor, a downstream surface that extends radially across at least a portion of the combustor and is axially separated from the upstream surface, and a plurality of tubes that extend through the downstream surface. A resonator is upstream from at least one of the tubes, and a fluid passage extends through the resonator and into the least one tube.

Another embodiment of the present invention is a combustor that includes an upstream surface that extends radially across at least a portion of the combustor, a downstream surface that extends radially across at least a portion of the combustor and is axially separated from the upstream surface, a fuel plenum between the upstream surface and the downstream surface, and a plurality of tubes that extend through the downstream surface. A resonator is between the fuel plenum and at least one of the tubes, and a fluid passage extends from the fuel plenum, through the resonator, and into the at least one tube.

The present invention may also include a combustor that includes an upstream surface that extends radially across at least a portion of the combustor, a downstream surface that extends radially across at least a portion of the combustor and is axially separated from the upstream surface, and a plurality of tubes that extend through the downstream surface. A resonator is connected to the upstream surface, and a fluid passage extends through the resonator and into at least one tube.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is circuit forth more particularly in the remainder of the specification, including reference to the accompanying figures, in which:

FIG. 2 is a cross-section view of the end cap shown in FIG. 1 taken along line A—A according to an embodiment of the present invention;

FIG. 3 is a cross-section view of the end cap shown in FIG. 1 taken along line A—A according to an embodiment of the present invention;

FIG. 4 is a cross-section view of the end cap shown in FIG. 1 taken along line A—A according to an embodiment of the present invention;

DETAILED DESCRIPTION OF THE INVENTION

Figure 1:
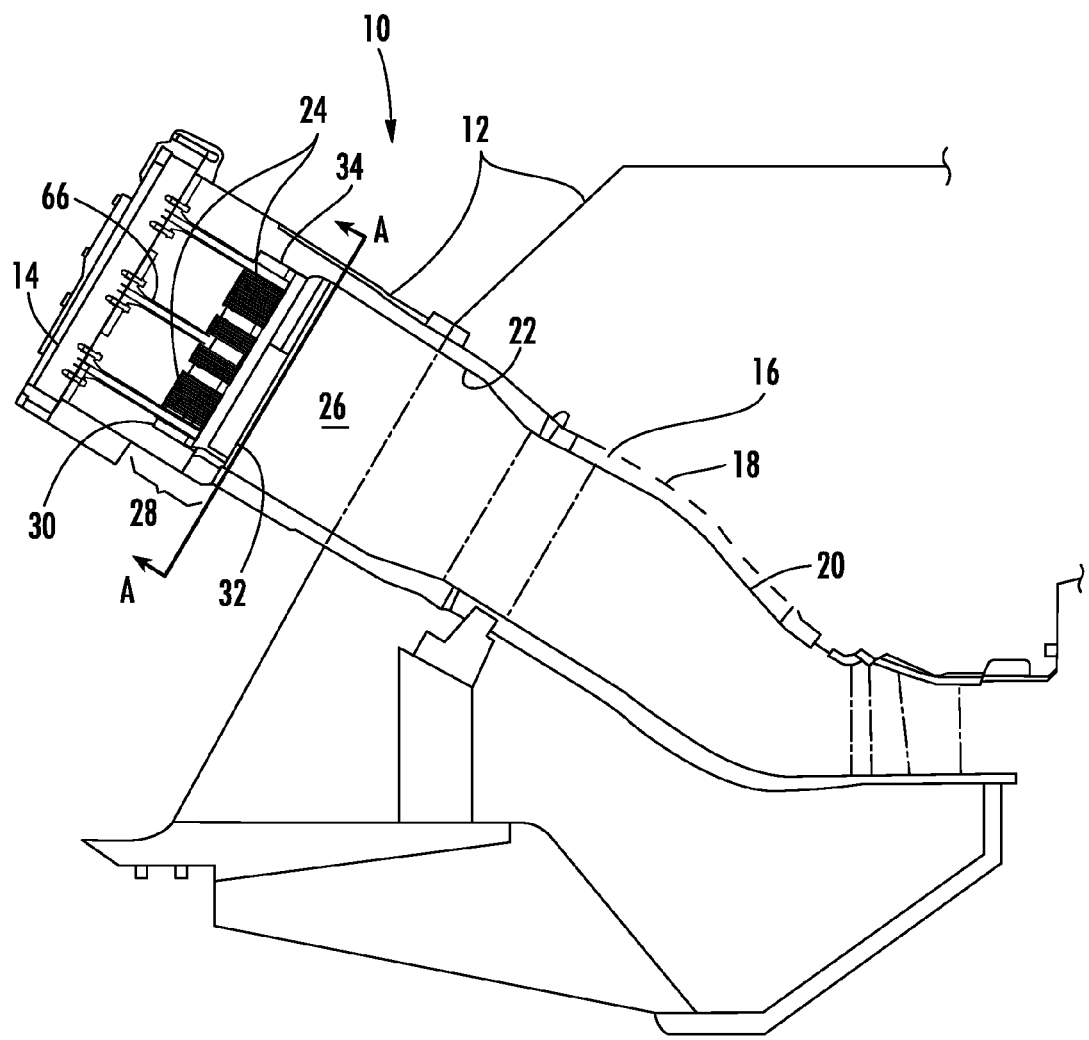
FIG. 1 is a simplified cross-section view of an exemplary combustor within the scope of various embodiments of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. In addition, the terms "upstream" and "downstream" refer to the relative location of components in a fluid pathway. For example, component A is upstream from component B if a fluid flows from component A to component B. Conversely, component B is downstream from component A if component B receives a fluid flow from component A.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention provide a combustor and a method for supplying fuel to a combustor. The combustor may include a plurality of tubes arranged in an end cap to enhance mixing between a working fluid, a fuel, and/or a diluent prior to combustion. The fuel and/or the diluent may be supplied through a resonator to one or more of the tubes to reduce or dampen resonant frequencies produced in the tubes. In particular embodiments, the resonator may be upstream from the tubes, between a fuel plenum and the tubes, and/or connected to the end cap to enhance the thermodynamic efficiency of the combustor, protect the combustor from accelerated wear, and/or reduce undesirable emissions over a wide range of combustor operating levels. Although exemplary embodiments of the present invention will be described generally in the context of a combustor incorporated into a gas turbine for purposes of illustration, one of ordinary skill in the art will readily appreciate that embodiments of the present invention may be applied to any combustor and are not limited to a gas turbine combustor unless specifically recited in the claims.

FIG. 1 shows a simplified cross-section view of an exemplary combustor 10, such as would be included in a gas turbine, within the scope of various embodiments of the present invention. A casing 12 and an end cover 14 may surround the combustor 10 to contain a working fluid flowing to the combustor 10. The working fluid may pass through flow holes 16 in an impingement sleeve 18 to flow along the outside of a transition piece 20 and liner 22 to provide convective cooling to the transition piece 20 and liner 22. When the working fluid reaches the end cover 14, the working fluid reverses direction to flow through a plurality of tubes 24 into a combustion chamber 26.

The tubes 24 are radially arranged in an end cap 28 upstream from the combustion chamber 26. As shown, the end cap 28 generally extends radially across at least a portion of the combustor 10 and may include an upstream surface 30 axially separated from a downstream surface 32. A shroud or cap shield 34 may circumferentially surround the upstream and downstream surfaces 30, 32. Each tube 24 may extend from the upstream surface 30 and/or through the downstream surface 32 of the end cap 28 to provide fluid communication for the working fluid to flow through the end cap 28 and into the combustion chamber 26. Although generally illustrated as cylindrical tubes in each embodiment, the cross-section of the tubes 24 may be any geometric shape, and the present invention is not limited to any particular cross-section unless specifically recited in the claims.

Various embodiments of the combustor 10 may include different numbers, shapes, and arrangements of tubes 24 separated into various bundles across the end cap 28. The tubes 24 in each bundle may be grouped in circular, triangular, square, or other geometric shapes, and the bundles may be arranged in various numbers and geometries in the end cap 28. For example, in the embodiment shown in FIG. 2, the tubes 24 are radially arranged across the end cap 28 as a single tube bundle. In contrast, FIG. 3 shows the tubes 24 arranged, for example, in six bundles 36 radially surrounding a single bundle 38. In the particular embodiment shown in FIG. 4, the tubes 24 are arranged in five pie-shaped bundles 40 that circumferentially surround a single fuel nozzle 42 aligned with an axial centerline 44 of the end cap 28. The fuel nozzle 42 may include, for example, a shroud 46 that circumferentially surrounds a center body 48 to define an annular passage 50 between the shroud 46 and the center body 48. One or more swirler vanes 52 may be located between the shroud 46 and the center body 48 to impart swirl to the working fluid flowing through the annular passage 50. In this manner, the fuel nozzle 42 may provide fluid communication through the end cap 28 to the combustion chamber 26 separate and apart from the tubes 24.

Figure 5:
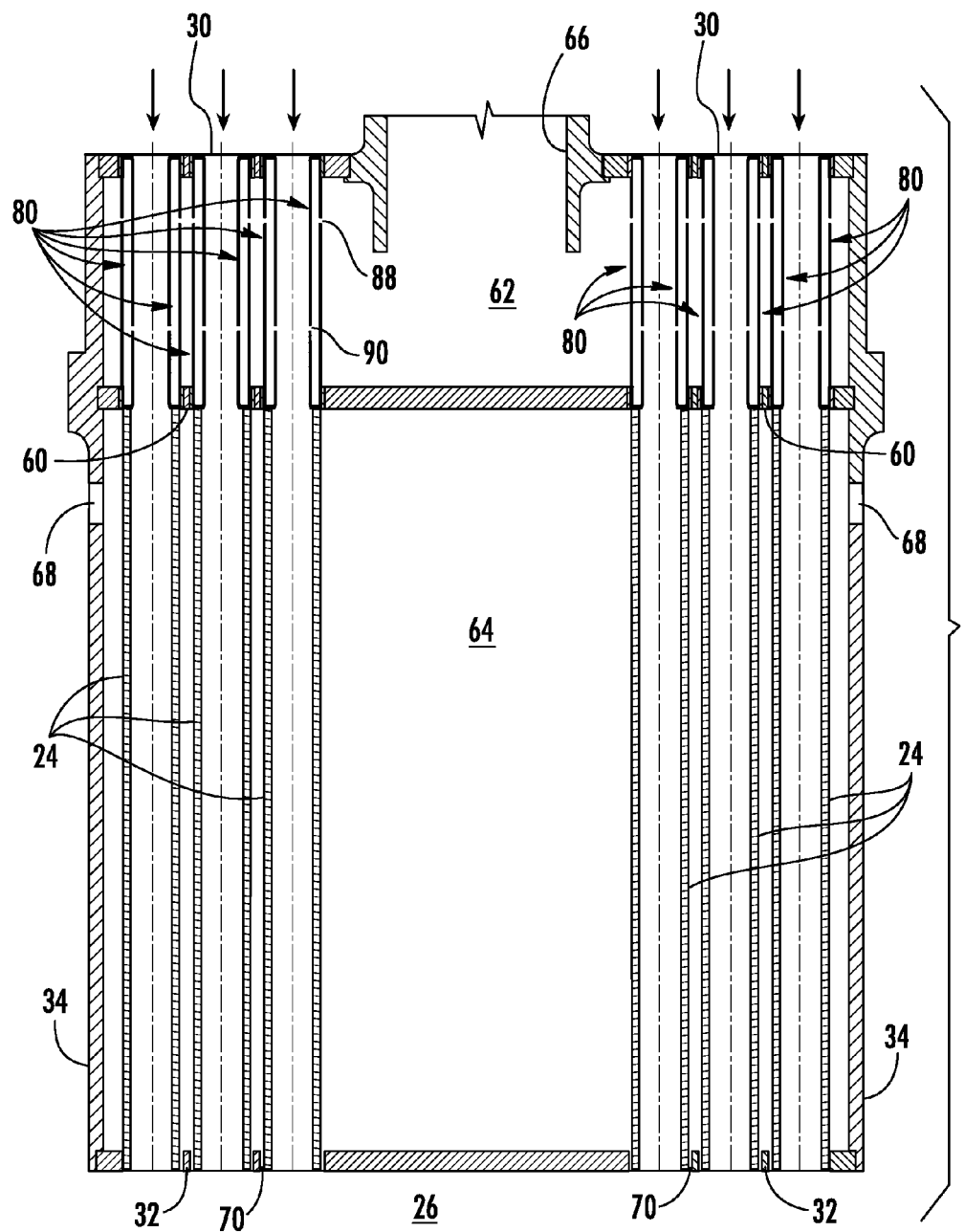
FIG. 5 is an enlarged cross-section view of the end cap shown in FIG. 1 according to a first embodiment of the present invention.

FIG. 5 provides an enlarged cross-section view of the end cap 28 shown in FIG. 1 according to various embodiments of the present invention. As shown, the end cap 28 generally extends radially across at least a portion of the combustor 10, and the tubes 24 extend axially between the upstream and downstream surfaces 30, 32 to provide fluid communication for the working fluid to flow through the end cap 28 and into the combustion chamber 26. A generally horizontal barrier 60 may extend radially between the upstream and downstream surfaces 30, 32 to axially separate two plenums inside the end cap 28. Specifically, the upstream surface 30, cap shield 34, and barrier 60 may enclose or define a fuel plenum 62 around the upstream portion of the tubes 24, and the downstream surface 32, cap shield 34, and barrier 60 may enclose or define an air plenum 64 around the downstream portion of the tubes 24.

A conduit 66 may extend from the end cover 14 through the upstream surface 30 of the end cap 28 to provide fluid communication for fuel, diluents, and/or other additives to flow from the end cover 14, through the conduit 66, and into the fuel plenum 62. The fuel, diluent, and/or other additives may flow around the tubes 24 in the fuel plenum 62 to provide convective cooling to the tubes 24 and pre-heat the fuel before flowing into the tubes 24 to mix with the working fluid flowing through the tubes 24.

The shroud or cap shield 34 may further include a plurality of air ports 68 that provide fluid communication for the working fluid to flow through the cap shield 34 and into the air plenum 64. In particular embodiments, a gap 70 between one or more tubes 24 and the downstream surface 32 may provide fluid communication from the air plenum 64, through the downstream surface 32, and into the combustion chamber 26. In this manner, a portion of the working fluid may flow through the air ports 68 in the cap shield 34 and into the air plenum 64 to provide convective cooling around the lower portion of the tubes 24 before flowing through the gaps 70 and into the combustion chamber 26.

As shown in FIG. 5, the combustor 10 may further include a resonator 80 between the fuel plenum 62 and one or more of the tubes 24. The resonator 80 may be machined from an alloy steel such as stainless steel or other suitable material capable of continuous exposure to the temperatures and volatile materials present in the end cap 28. As used herein, the term "resonator" includes any device or system that reduces or damps fluid flow into the tubes 24 to alter the natural, resonant, or harmonic frequencies produced by fluid flow through the tubes 24. In particular embodiments, the resonator 80 may be positioned upstream from specific tubes 24 to interfere with or disrupt the natural, resonant, or harmonic frequencies produced by adjacent tubes 24 that do not have resonators 80. Alternately, a separate resonator 80 may be positioned upstream from each tube 24, and the various resonators 80 may be independently or collectively tuned to achieve the desired resonant effect.

Figure 6:
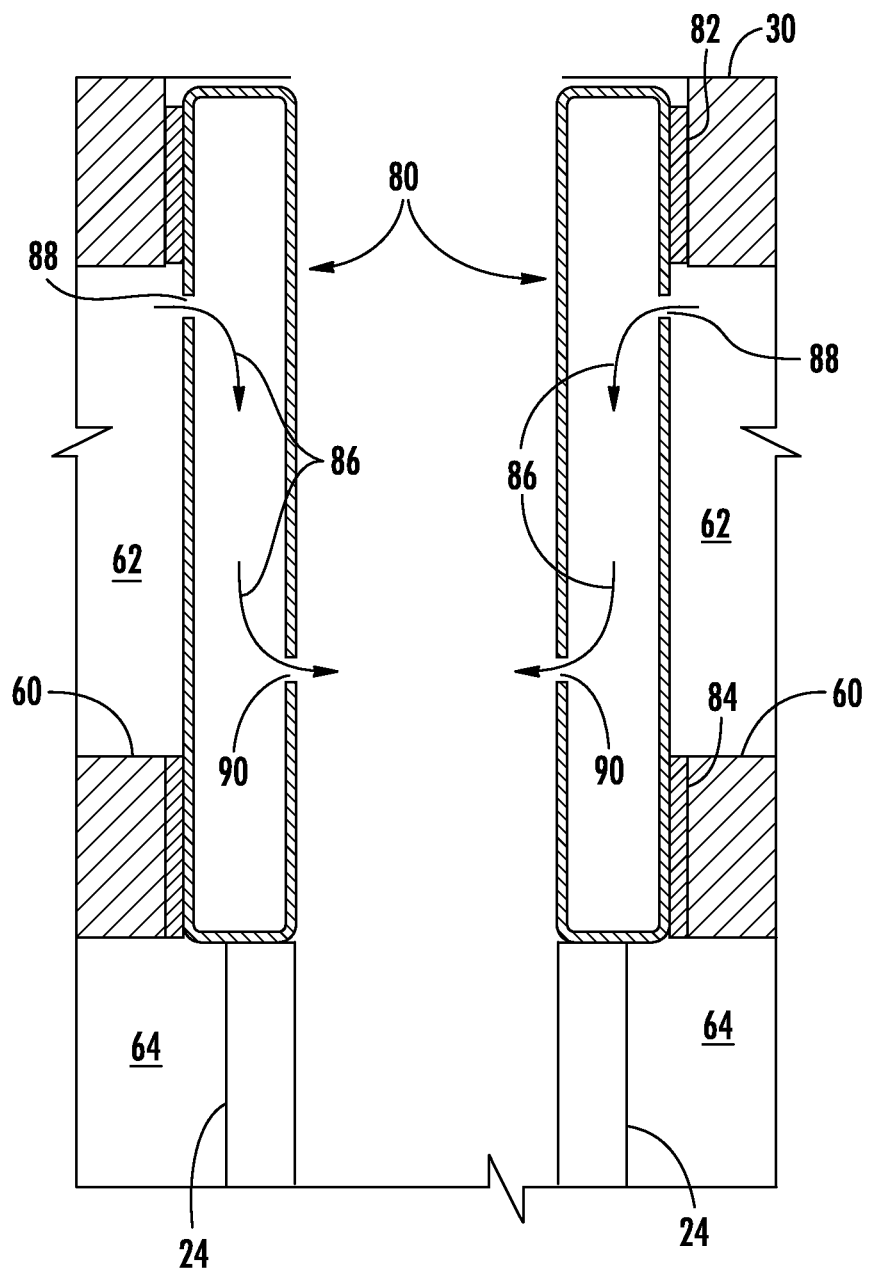
FIG. 6 is an enlarged cross-section view of a portion of the end cap shown in FIG. 5 according to an embodiment of the present invention.

FIG. 6 provides an enlarged cross-section view of a portion of the end cap 28 shown in FIG. 5 according to an embodiment of the present invention. As shown in this particular embodiment, the resonator 80 may be held firmly in position by an upstream connection 82 between the upstream surface 30 and the resonator 80 and/or a downstream connection 84 between the resonator 80 and the barrier 60 and/or the tubes 24. The upstream and downstream connections 82, 84 may include, for example, a nickel braze joint, a weld joint, or other suitable technique for securely holding the resonator 80 in place inside the end cap 28. In addition, the upstream and downstream connections 82, 84 may prevent fluids from leaking between the fuel and air plenums 62, 64.

As further shown in FIG. 6, the resonator 80 may be a cylindrical insert that abuts the tube 24 or an extension between the tube 24 and the upstream surface 30. The resonator 80 provides a fluid passage 86 from the fuel plenum 62, through the resonator 80, and into the tube 24. The fluid passage 86 may include, for example, one or more inlet and outlet ports 88, 90 that provide fluid communication from the fuel plenum 62 into the resonator 80 and from the resonator 80 into the tube 24, respectively. The tortuous path and/or volume inside the resonator 80 reduces or damps fluid flow into the tubes 24 to alter the natural, resonant, or harmonic frequencies produced by fluid flow through the tubes 24. In particular embodiments, the outlet ports 90 may be angled radially, axially, and/or azimuthally to project and/or impart swirl to the fuel flowing through the outlet ports 90 and into the tubes 24. Alternately or in addition, the number and/or cross-sectional area of the inlet ports 88 may be less or smaller than the number and/or cross-sectional area of the outlet ports 90. In this manner, the fewer and/or smaller inlet ports 88 may restrict fluid flow into the resonator 80 to enhance normalization of the fuel flow through the outlet ports 90 and into the tubes 24.

Figure 7:
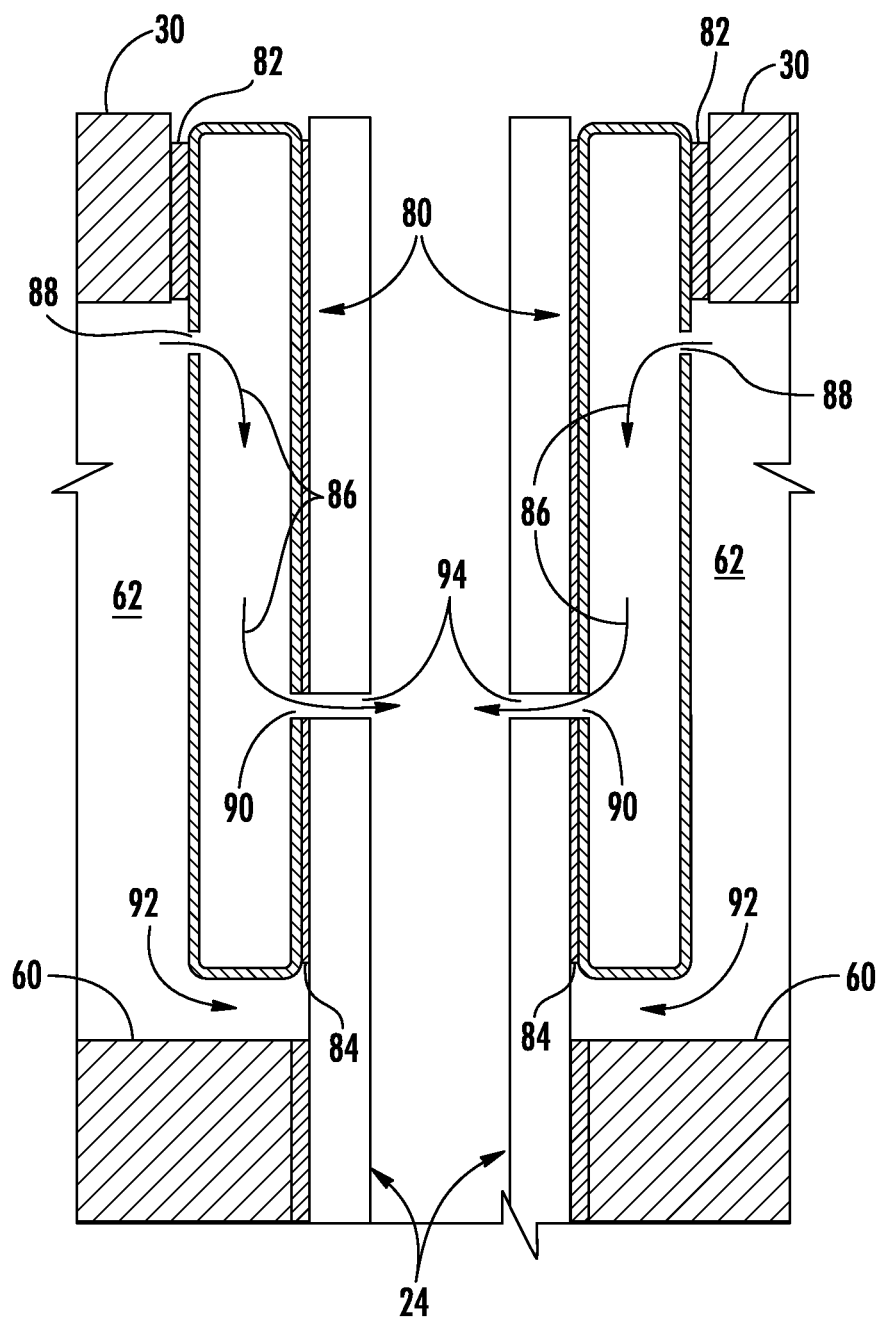
FIG. 7 is an enlarged cross-section view of a portion of the end cap shown in FIG. 5 according to an alternate embodiment of the present invention.

FIG. 7 provides an enlarged cross-section view of a portion of the end cap 28 shown in FIG. 5 according to an alternate embodiment of the present invention. The resonator 80 again includes the upstream connection 82, fluid passage 86, and inlet and outlet ports 88, 90 as previously described with respect to the embodiment shown in FIG. 6. In this particular embodiment, however, the resonator 80 circumferentially surrounds at least a portion of the tube 24 inside the fuel plenum 62. As a result, the tube 24 may further include one or more fuel ports 94 that complete the fluid passage 86 from the fuel plenum 62, through the resonator 80, and into the tube 24. In addition, the downstream connection 84 may be between the tube 24 and the resonator 80, with a space or gap 92 between the resonator 80 and the barrier 60. The temperature of the fuel and working fluid flowing around and/or through the tubes 24 may vary considerably during combustor 10 operations, and the combined location of the upstream and downstream connections 82, 84 and the fluid passage 86 through the resonator 80 provide additional axial flexibility between the upstream surface 30 and the tube 24 to accommodate thermal expansion between these components that might occur during transient conditions. One of ordinary skill in the art will readily appreciate that alternate locations and/or combinations of connections between the upstream surface 30, tubes 24, barrier 60, and/or resonator 80 are within the scope of various embodiments of the present invention, and the specific location or number of connections is not a limitation of the present invention unless specifically recited in the claims.

The axial position, number, and size of inlet and outlet ports 88, 90 for each resonator 80 may be selected to optimize the fluid flow through each resonator 80 and into each tube 24 at various operating levels while also enhancing the combustion dynamics. For example, locating the outlet ports 90 closer to the upstream surface 30 of the end cap 28 allows more time for convective mixing between the fuel and working fluid before the mixture reaches the combustion chamber 26. Alternately or in addition, the number and/or surface area of the inlet ports 88 for each resonator 80 may be adjusted independently from other resonators 80 to adjust the pressure and/or flow rate of fuel flowing into the resonator 80, thereby adjusting the resulting resonant frequency of the associated tube 24 and/or reducing any harmonic interaction between other tubes 24 to enhance the combustion dynamics produced in the combustor 10. As a result, the various embodiments described herein may enhance the thermodynamic efficiency of the combustor, protect the combustor from accelerated wear, and/or reduce undesirable emissions over a wide range of combustor operating levels.

The various embodiments shown in FIGS. 1-7 provide multiple combinations of methods for supplying fuel to the combustor 10 and/or reducing combustor dynamics. As shown in FIGS. 5-7 for example, the method may include flowing the working fluid through the tubes 24 and flowing the fuel from the fuel plenum 62, through the resonator 80, and into the tube 24. The method may further include flowing the working fluid around the tubes 24 inside the air plenum 64 before flowing the working fluid into the combustion chamber 26. In particular embodiments, the method may reduce the fuel flow through the inlet ports 88 compared to the outlet ports 90 to further tune the resonant frequency generated by individual tubes 24. One of ordinary skill in the art can readily appreciate these and multiple other methods for reducing or damping natural, resonant, and/or harmonic frequencies produced by the tubes 24 based on the teachings herein to support expanded combustor 10 operations without exceeding design margins associated with flame holding, combustion dynamics, and/or emissions limits.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A combustor, comprising:
 a. an upstream surface that extends radially across at least a portion of the combustor;
 b. a downstream surface that extends radially across at least a portion of the combustor and is axially separated from the upstream surface;
 c. a barrier disposed between the upstream and downstream surfaces, wherein the barrier and the upstream surface at least partially define a fuel plenum;
 d. a plurality of tubes that extend downstream from the fuel plenum and through the downstream surface; and
 e. a resonator upstream from at least one of the tubes, wherein the resonator includes an outer wall, an inner wall and a fluid passage defined therebetween, wherein the resonator is at least partially disposed within the fuel plenum and extends at least partially through the barrier;
 f. wherein the resonator defines an inlet port in the outer wall and outer port in the inner wall, wherein the inlet port provides for fluid communication between the fuel plenum and the fluid passage and the outlet port is in fluid communication with the at least one tube.

2. The combustor as in claim 1, wherein the resonator circumferentially surrounds at least a portion of the at least one tube.

3. The combustor as in claim 1, further comprising a separate resonator upstream from each tube.

4. The combustor as in claim 1, wherein the inlet port has a smaller cross-sectional area than the outlet port.

5. The combustor as in claim 1, further comprising an upstream connection between the upstream surface and the resonator.

6. The combustor as in claim 1, further comprising a downstream connection between the at least one tube and the resonator.

7. The combustor as in claim 1, further comprising a downstream connection between the resonator and the barrier.

8. A combustor, comprising:
 a. an upstream surface that extends radially across at least a portion of the combustor;
 b. a downstream surface that extends radially across at least a portion of the combustor and is axially separated from the upstream surface;
 c. a barrier disposed between the upstream and downstream surfaces, wherein the barrier and the upstream surface at least partially define a fuel plenum;
 d. a plurality of tubes that extend downstream from the fuel plenum and through the downstream surface; and
 e. a resonator between the fuel plenum and at least one of the tubes, wherein the resonator includes an outer wall, an inner wall and a fluid passage defined therebetween, wherein the resonator is at least partially disposed within the fuel plenum and extends at least partially through the barrier;
 f. wherein the fluid passage provides for fluid communication from the fuel plenum, through the resonator, and into the at least one tube.

9. The combustor as in claim 8, wherein the resonator circumferentially surrounds at least a portion of the at least one tube.

10. The combustor as in claim 8, further comprising a separate resonator between the fuel plenum and each tube.

11. The combustor as in claim 8, further comprising an inlet port in the resonator, wherein the inlet port provides fluid communication from the fuel plenum into the resonator.

12. The combustor as in claim 8, further comprising an outlet port in the resonator, wherein the outlet port provides fluid communication from the resonator into the at least one tube.

13. The combustor as in claim 8, further comprising an upstream connection. between the upstream surface and the resonator.

14. The combustor as in claim 8, further comprising a downstream connection between the at least one tube and the resonator.

15. A combustor, comprising:
 a. an upstream surface that extends radially across at least a portion of the combustor;
 b. a downstream surface that extends radially across at least a portion of the combustor and is axially separated from the upstream surface;
 c. a barrier disposed between the upstream and downstream surfaces, wherein the barrier and the upstream surface at least partially define a fuel plenum;
 d. a plurality of tubes that extend downstream from the fuel plenum and through the downstream surface;
 e. a resonator connected to the upstream surface, wherein the resonator includes an outer wall, an inner wail and a fluid passage defined therebetween, wherein the resonator is at least partially disposed within the fuel plenum and extends at least partially through the barrier; and
 f. wherein the fluid passage provides for fluid communication through the resonator and into at least one tube a the plurality of tubes.

16. The combustor as in claim 15, wherein the resonator circumferentially surrounds at least a portion of the at least one tube.

17. The combustor as in claim 15, wherein the resonator includes an inlet port that provides fluid communication into the resonator and an outlet port that provides fluid communication from the resonator into the at least one tube.

18. The combustor as in claim 17, wherein the inlet port has a smaller cross-sectional area than the outlet port.

* * * * *